(12) United States Patent
Draper et al.

(10) Patent No.: US 8,544,675 B1
(45) Date of Patent: Oct. 1, 2013

(54) FLUID RESERVOIR ASSEMBLY

(75) Inventors: Don Rulon Draper, Chanhassen, MN (US); Christopher Thomas Arneson, New Market, MN (US)

(73) Assignee: Eaton Corporation, Cleveland, OH (US)

( * ) Notice: Subject to any disclaimer, the term of this patent is extended or adjusted under 35 U.S.C. 154(b) by 167 days.

(21) Appl. No.: 13/117,876

(22) Filed: May 27, 2011

Related U.S. Application Data

(60) Provisional application No. 61/349,777, filed on May 28, 2010.

(51) Int. Cl.
*F17C 13/06* (2006.01)

(52) U.S. Cl.
USPC ......... 220/622; 220/89.2; 220/89.1; 220/4.33

(58) Field of Classification Search
CPC ............................... F17C 13/06; B65D 90/10
USPC .............. 220/622, 4.33, 4.17, 201, 328, 327, 220/203.1, 203.08, 203.09, 265, 831, 832, 220/4.12, 4.13, 647, 646, 89.2, 89.1, 745, 220/913, 366.1, 908, 826, 810
See application file for complete search history.

(56) References Cited

U.S. PATENT DOCUMENTS

| | | | |
|---|---|---|---|
| 1,720,789 A | 7/1929 | Heusser | |
| 2,113,776 A | 4/1938 | Smith et al. | |
| 3,648,400 A * | 3/1972 | Wolfe | ............................ 43/54.1 |
| 4,146,047 A | 3/1979 | Wood et al. | |
| 4,177,931 A | 12/1979 | Evans | |
| 4,438,792 A | 3/1984 | Timberlake, Jr. | |
| 4,576,303 A | 3/1986 | Mundt et al. | |
| 4,936,351 A | 6/1990 | Wells et al. | |
| 5,632,505 A | 5/1997 | Saccone et al. | |
| 6,003,705 A * | 12/1999 | Burguieres, Jr. | ............... 220/1.5 |
| 6,336,641 B1 | 1/2002 | Williams | |
| 2009/0014447 A1* | 1/2009 | Horn | ............................. 220/324 |

* cited by examiner

*Primary Examiner* — Stephen Castellano
(74) *Attorney, Agent, or Firm* — Merchant & Gould P.C.

(57) ABSTRACT

A fluid reservoir assembly includes a base assembly defining an interior cavity that is adapted to receive a fluid. A cover assembly is engaged to the base assembly. The cover assembly includes a first end and an oppositely disposed second end. A first plurality of fasteners engages the first end of the cover assembly to the base assembly. The first plurality of fasteners has a first strength. A second plurality of fasteners engages the second end of the cover assembly to the base assembly. The second plurality of fasteners has a second strength. The first strength is less than the second strength.

22 Claims, 13 Drawing Sheets

FLUID RESERVOIR ASSEMBLY

CROSS-REFERENCE TO RELATED APPLICATION

The present application claims priority to U.S. Provisional Patent Application Ser. No. 61/349,777 entitled FIBER RESERVOIR ASSEMBLY and filed on May 28, 2010, the disclosure of which is hereby incorporated by reference in its entirety.

BACKGROUND

Rotary fluid devices such as fluid pumps and/or motors are typically in fluid communication with a fluid source. Fluid from the fluid source is provided to the input of the rotary fluid devices.

In an open loop circuit, the fluid source is a reservoir. Conventional reservoirs are designed to contain a volume of fluid at low or atmospheric pressure.

SUMMARY

An aspect of the present disclosure relates to a fluid reservoir assembly. The fluid reservoir assembly includes a base defining an interior cavity. A cover is engaged to the base at a connection. The connection includes a first portion and a second portion. The first portion has a strength that is less than the strength of the second portion.

Another aspect of the present disclosure relates to a fluid reservoir assembly. The fluid reservoir assembly includes a base assembly defining an interior cavity that is adapted to receive a fluid. A cover assembly is engaged to the base assembly. The cover assembly includes a first end and an oppositely disposed second end. A first plurality of fasteners engages the first end of the cover assembly to the base assembly. The first plurality of fasteners has a first strength. A second plurality of fasteners engages the second end of the cover assembly to the base assembly. The second plurality of fasteners has a second strength. The first strength is less than the second strength.

Another aspect of the present disclosure relates to fluid reservoir assembly. The fluid reservoir assembly includes a base assembly defining an interior cavity that is adapted to receive a fluid. A cover assembly is engaged to the base assembly. The cover assembly includes a cover, a first side plate and a second side plate. The cover includes a first end and, an oppositely disposed second end, a first side and an oppositely disposed second side. The first side plate is engaged to the cover. The first side plate is disposed adjacent to the first side of the cover. The second side plate is engaged to the cover and disposed adjacent to the second side of the cover. The first and second side plates define a channel. A first plurality of fasteners engages the first end of the cover assembly to the base assembly. The first plurality of fasteners has a first strength. A second plurality of fasteners engages the second end of the cover assembly to the base assembly. The second plurality of fasteners has a second strength. The first strength is less than the second strength.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
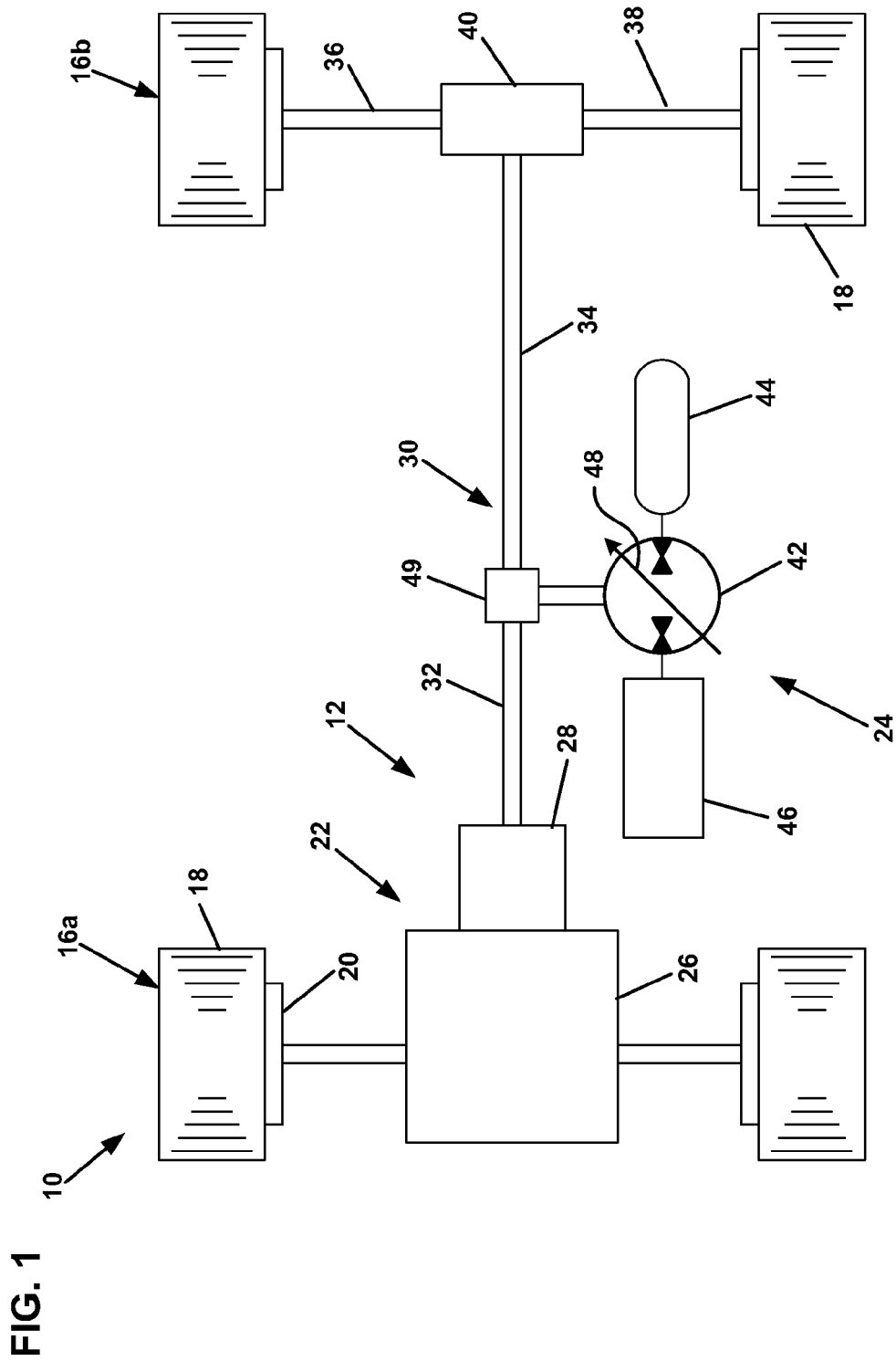
FIG. 1 is a schematic representation of a drive system for a vehicle having exemplary features of aspects in accordance with the principles of the present disclosure.

Referring now to FIG. 1, a schematic representation of a drive system, generally designated 10, of a vehicle is shown. In one aspect of the present disclosure, the drive system 10 is suitable for use in an on-highway vehicle, such as a truck, a refuse truck, a bus or an automobile, or an off-highway vehicle, such as construction and agriculture vehicles.

In the depicted example of FIG. 1, the drive system 10 includes a hybrid drive assembly, generally designated 12. The hybrid drive assembly 12 is adapted to selectively propel the vehicle.

In one aspect of the present disclosure, the drive system 10 further includes a front plurality of wheels 16a and a rear plurality of wheels 16b. Each of the front and rear plurality of wheels 16a, 16b includes at least two wheels 18. A brake 20 is operably associated with each of the wheels 18 of the front and rear plurality of wheels 16a, 16b of the drive system 10. The brakes 20 are adapted to selectively decrease the kinetic energy of the vehicle. In one aspect of the present disclosure, the brakes 20 are friction brakes. Friction brakes that are suitable for use in the drive system 10 include, but are not limited to, disk brakes, drum brakes, mechanically actuated brakes, hydraulically actuated brakes, electronically actuated brakes, or combinations thereof.

The hybrid drive assembly 12 of the drive system 10 includes a first power source, generally designated 22, and a second power source, generally designated 24. In the depicted example of FIG. 1, the second power source 24 is disposed in parallel to the first power source 22. In another embodiment, the second power source 24 could be disposed in series to the first power source 22.

In one aspect of the present disclosure, the first power source 22 of the hybrid drive assembly 12 includes a conventional prime mover 26, such as an internal combustion engine.

In another aspect of the present disclosure, the first power source 22 also includes a conventional transmission 28. The prime mover 26 generates power in response to combustion of fuel. The transmission 28 directs the power from the prime mover 26 to at least one of wheels 18 of the front and/or rear plurality of wheels 16a, 16b through a drive line, generally designated 30.

In one aspect of the present disclosure, the drive line 30 includes a front drive shaft 32, a rear drive shaft 34, left and right axle shafts 36, 38 and a differential 40. The differential 40 is disposed between the left and right axle shafts 36, 38.

In one aspect of the present disclosure, the second power source 24 is a hydraulic power source. The second power source 24 includes a pump/motor unit 42, an energy storage unit 44, and a fluid reservoir assembly 46.

The pump/motor unit 42 is of a variable displacement type. In one aspect of the present disclosure, the pump/motor unit 42 is of the axial piston type. The pump/motor unit 42 includes a servo actuator that is engaged to a variable swashplate 48. The servo actuator is adapted to selectively adjust the angle of the swashplate 48, which adjusts the displacement of the pump/motor unit 42.

The pump/motor unit 42 is in selective fluid communication with the energy storage unit 44 and the fluid reservoir assembly 46, which will be described in greater detail subsequently. In one aspect of the present disclosure, the energy storage unit 44 is an accumulator. In another aspect of the present disclosure, the energy storage unit 44 is a gas-charged accumulator.

The second power source 24 further includes an engagement assembly 49. In one aspect of the present disclosure, the engagement assembly 49 is disposed between the front and rear drive shafts 32, 34. The engagement assembly 49 is adapted to selectively engage the pump/motor unit 42 to the drive line 30. In one aspect of the present disclosure, the engagement assembly 49 is a clutch. In another aspect of the present disclosure, the engagement assembly 49 is a transfer case.

In one aspect of the present disclosure, the engagement assembly 49 is adapted to engage the pump/motor unit 42 to the drive line 30 when the vehicle decelerates. During deceleration, the pump/motor unit 42 is engaged with the drive line 30 and acts as a pump to pump fluid from the fluid reservoir assembly 46 to the energy storage unit 44. As the fluid is pumped to the energy storage unit 44, the pressure of the fluid in the energy storage unit 44 increases.

In another aspect of the present disclosure, the engagement assembly 49 is adapted to engage the pump/motor unit 42 to the drive line 30 when the vehicle accelerates. During acceleration, the pump/motor unit 42 is engaged with the drive line 30 and acts as a motor. The pump/motor unit 42 receives pressurized fluid from the energy storage unit 44, which results in rotation of an output shaft of the pump/motor unit 42 that transmits torque to the drive line 30. This torque generated from the pump/motor unit 42 and transmitted to the drive line 30 is used to propel the vehicle.

Referring now to FIGS. 2-6, the fluid reservoir assembly 46 is shown. The fluid reservoir assembly 46 includes an enclosure 50 having a base assembly 52 and a cover assembly 54.

The base assembly 52 includes a base plate 56. In one embodiment, the base plate 56 is made of a steel material. In the depicted embodiment, the base plate 56 is generally rectangular in shape. It will be understood, however, that the scope of the present disclosure is not limited to the base plate 56 being rectangular in shape as the base plate 56 could be one of various geometric shape (e.g., circular, square, triangular, etc.).

The base assembly 52 further includes a first sidewall 58a, an oppositely disposed second sidewall 58b, a third sidewall 58c, and an oppositely disposed fourth sidewall 58d. The first sidewall 58a includes a first end 60, an oppositely disposed second end 62, a first side 64 that extends between the first and second ends 60, 62 and an oppositely disposed second side 66 that extends between the first and second ends 60, 62. The second sidewall 58b includes a first end 68, an oppositely disposed second end 70, a first side 72 that extends between the first and second ends 68, 70, and an oppositely disposed second side 74 that extends between the first and second ends 68, 70. The third sidewall 58c includes a first end 76 and an oppositely disposed second end 78. The third sidewall 58c extends between the first sides 64, 72 of the first and second sidewalls 58a, 58b. The fourth sidewall 58d includes a first end 80 and an oppositely disposed second end 82. The fourth sidewall 58d extends between the second sides 66, 74 of the first and second sidewalls 58a, 58b.

The first ends 60, 68, 76, 80 of the first, second, third and fourth sidewalls 58a-d are engaged (e.g., welded, fastened, etc.) to the base plate 56 so that the second ends 62, 70, 78, 82 extend outwardly from the base plate 56. In the depicted embodiment, the sidewalls 58a-d extend outwardly from the base plate 56 in a generally perpendicular direction. In one embodiment, the sidewalls 58a-d are made of a steel material.

In one embodiment, adjacent sidewalls 58a-d are engaged (e.g., welded, fastened, etc.) together. While the sidewalls 58a-d are shown as being separate plates that are engaged together, it will be understood that the sides of the base assembly 52 could be formed from one or two plates that are bent and engaged to each other.

In the depicted embodiment, the base assembly 52 includes a first mounting bracket 84a and a second mounting bracket 84b. The first and second mounting brackets 84a, 84b are adapted to mount the fluid reservoir assembly 46 to a structure in the vehicle. In one embodiment, the fluid reservoir assembly 46 is mounted to the chassis of the vehicle.

In the depicted embodiment, the first mounting bracket 84a is disposed on the third sidewall 58c while the second mounting bracket 84b is disposed on the fourth sidewall 58d. In one embodiment, the first and second mounting brackets 84a, 84b are integral connected to the third and fourth sidewalls 58c, 58d, respectively. Each of the first and second mounting brackets 84a, 84b includes a mount 86 having a mounting face 88. In the depicted embodiment, the mounts 86 of the first and second mounting brackets 84a, 84b extend outwardly from the third and fourth sidewalls 58c, 58d in a generally perpendicular direction. Each of the mounts 86 includes a plurality of mounting openings 90 that extends through the mounts 86. The mounting openings 90 are adapted to receive fasteners that mount the fluid reservoir assembly 46 to the vehicle.

In the depicted embodiment, a first plurality of ribs 92a extends between the mount 86 of the first mounting bracket 84a and the third sidewall 58c while a second plurality of ribs 92b extends between the mount 86 of the second mounting bracket 84b and the fourth sidewall 58b. The first and second pluralities of ribs 92a, 92b are adapted to provide support to the respective mounts 86.

The base assembly 52 defines an interior cavity 94. The interior cavity 94 is adapted to receive a fluid. In the depicted embodiment, the interior cavity 94 is adapted to receive a fluid such as hydraulic oil. The interior cavity 94 includes an opening defined by the second ends 62, 70, 78, 82 of the sidewalls 58a-d.

The base assembly 52 further defines a fluid inlet 96 and a fluid outlet 98. The fluid inlet 96 and the fluid outlet 98 are defined by the first sidewall 58a. In the depicted embodiment, the fluid inlet 96 and the fluid outlet 98 are disposed on the first sidewall 58a at a location that is adjacent to the first end 60 of the first sidewall 58a so that the fluid inlet 96 and fluid outlet 98 are adjacent to the base plate 56.

The base assembly 52 includes a fluid filter 100. In the depicted embodiment, the fluid inlet 96 is in fluid communication with the fluid filter 100. In one embodiment, a conventional fluid filter that is suitable for use as the fluid filter 100 is model number RF500 manufactured by Hydac Filter Systems GmbH. In the depicted embodiment, the fluid filter 100 is engaged to the first sidewall 58a by a plurality of fasteners.

The base assembly 52 further includes a temperature sensor 102. The temperature sensor 102 is adapted to provide data to an electronic controller related to the temperature of the fluid in the interior cavity 94 of the fluid reservoir assembly 46. In the depicted embodiment, the temperature sensor 102 is engaged to the first sidewall 58a. The temperature sensor 102 passes through the first sidewall 58a to monitor the fluid temperature in the interior cavity 94. In one embodiment, a conventional temperature sensor suitable for use as the temperature sensor 102 is product number 15304944 manufactured by Delphi Connection Systems.

The base assembly 52 includes a sight gage 104. In the depicted embodiment, the sight gage 104 is disposed on the second sidewall 58b at a location that is adjacent to the second end 70 of the second sidewall 58b. The sight gage 104 is adapted to allow a user to visually determine a level of fluid in the interior cavity 94. In one embodiment, a gage suitable for use as the sight gage 104 is model number T-LLG-5 manufactured by Lenz Inc.

The base assembly 52 further includes a drain plug 106. The drain plug 106 is engaged with the base plate 56. The drain plug 106 is adapted to close a drain passage that is used to empty the interior cavity 94 of fluid. In one embodiment, the drain plug 106 is a magnetic drain plug, which attracts magnetic particles in the fluid.

In one embodiment, a screen 108 is disposed in the interior cavity 94 of the base assembly 50. In the depicted embodiment of FIG. 6, the screen 108 is disposed between the fluid inlet 96 and the fluid outlet 98.

The cover assembly 54 is adapted to enclose the interior cavity 94 of the base assembly 52. The cover assembly 54 is engaged to the second ends 62, 70, 78, 82 of the sidewalls 58a-d.

Referring now to FIGS. 7-12, the cover assembly 54 is shown. The cover assembly 54 includes a cover 110 having a first surface 112 and an oppositely disposed second surface 114. In the depicted embodiment, the first surface 112 is an exterior surface of the fluid reservoir assembly 46.

In the depicted embodiment, the cover 110 is generally rectangular in shape. It will be understood, however, that the scope of the present disclosure is not limited to the cover 110 being rectangular in shape as the cover 110 could have other geometric shapes. The cover 110 includes a first end 116, an oppositely disposed second end 118, a first side 120 that extends between the first and second ends 116, 118 and an oppositely disposed second side 122 that extends between the first and second ends 116, 118.

The cover 110 includes a first side plate 124a and a second side plate 124b. In the depicted embodiment, the first and second side plates 124a, 124b are generally wedge shaped.

The first and second side plates 124a, 124b are engaged (e.g., welded, fastened, etc.) to the second surface 114 of the cover 110 so that the first and second side plates 124a, 124b extend outwardly from the second surface 114 of the cover. In the depicted embodiment, the first and second side plates 124a, 124b extend outwardly from the second surface 114 in a direction that is generally perpendicular to the second surface 114. In one embodiment, the first and second side plates 124a, 124b are welded to the second surface 114 of the cover 110.

In the depicted embodiment, the first and second side plates 124a, 124b are substantial similar in shape and structure. Therefore, only the first side plate 124a will be described for ease of description purposes. Features of the second side plate 124b will have the same reference numeral as features of the first side plate 124a except that the letter "b" will follow the reference numeral rather than the letter "a."

The first side plate 124a includes a first axial end 128a and an oppositely disposed second axial end 130a. In the depicted embodiment, the first axial end 128a has a width W1 that is greater than a width W2 of the second axial end 130a. The first side plate 124a further includes a first longitudinal side 132a and a second longitudinal side 134a. In the depicted embodiment, the first longitudinal sides 132a, 132b of the first and second side plates 124a, 124b is mounted to the second surface 114 of the cover 110.

The first and second longitudinal sides 132a, 134a form an angle $\alpha$. In the depicted embodiment, the angle $\alpha$ is less than or equal to about 45 degrees. In another embodiment, the angle $\alpha$ is less than or equal to about 30 degrees. In another embodiment, the angle $\alpha$ is in the range of about 15 degrees to about 45 degrees.

In the depicted embodiment, the first and second side plates 124a, 124b are oriented on the cover 110 so that the first and second side plates 124a, 124b are generally parallel. The first side plate 124a is disposed adjacent to the first side 120 of the cover 110 while the second side plate 124b is disposed adjacent to the second side 122.

The first and second side plates 124a, 124b are disposed on the cover 110 so that first axial ends 128a, 128b of the first and second side plates 124a, 124b are adjacent to the first end 116 of the cover 110. In the depicted embodiment, the first axial ends 128a, 128b of the first and second side plates 124a, 124b are disposed closer to the first end 116 of the cover 110 than the second axial ends 130a, 130b of the first and second side plates 124a, 124b are disposed to the second end 118 of the cover 110.

The first and second side plates 124a, 124b and the cover 110 cooperatively define a channel 135 disposed between the first and second side plates 124a, 124b. Each of the first and second side plates 124a, 124b includes a bracket 136. The bracket 136 is mounted to the first and second side plates 124a, 124b. In the depicted embodiment, the brackets 136 are mounted to the first and second side plates 124a, 124b at a location that is adjacent to the first axial ends 128a, 128b and the second longitudinal sides 134a, 134a of the first and second side plates 124a, 124b. Each of the brackets 136 includes an extension 138 that extends into the channel 135. In the depicted embodiment, each of the brackets 136 is general L-shaped.

The cover 110 further includes a first lip 140, a second lip 142 and a third lip 144 disposed at a perimeter of the cover 110. In the depicted embodiment, the first, second and third lips 140, 142, 144 extend outwardly from the second surface 114 of the cover 110 at a direction that is generally perpendicular to the second surface 114. In the depicted embodiment, the first, second and third lips 140, 142, 144 are formed by bending a portion of the cover 110 at the perimeter so that the portions extends outwardly from the second surface 114. The first lip 140 extends along the first side 120 of the cover.

The second lip 142 extends along the second side 122 of the cover 110 while the third lip 144 extends along the second end 118 of the cover 110.

Each of the first and second lips 140, 142 includes a notch 146 that extends through the corresponding lip 140, 142. The notches 146 are adapted to provide an area of weakness in the cover 110. In the depicted embodiment, the notches 146 are axially disposed at a location that is between the second axial ends 130a, 130b of the first and second side plates 124a, 124b and the second end 118 of the cover 110.

The cover 110 includes a first plurality of holes 148 and a second plurality of holes 150. In the depicted embodiment, the first plurality of holes 148 is disposed around a portion of the perimeter of the cover 110 while the second plurality of holes 150 is disposed about the remaining portion of the perimeter of the cover 110. The first plurality of holes 148 is disposed on the cover 110 along the first end 116 of the cover 110 and along a portion of the first and second sides 120, 122 adjacent to the first end 116. The second plurality of holes 150 is disposed on the cover 110 along the second end 118 of the cover 110 and along a portion of the first and second sides 120, 122 adjacent to the second end 118.

Figure 2:
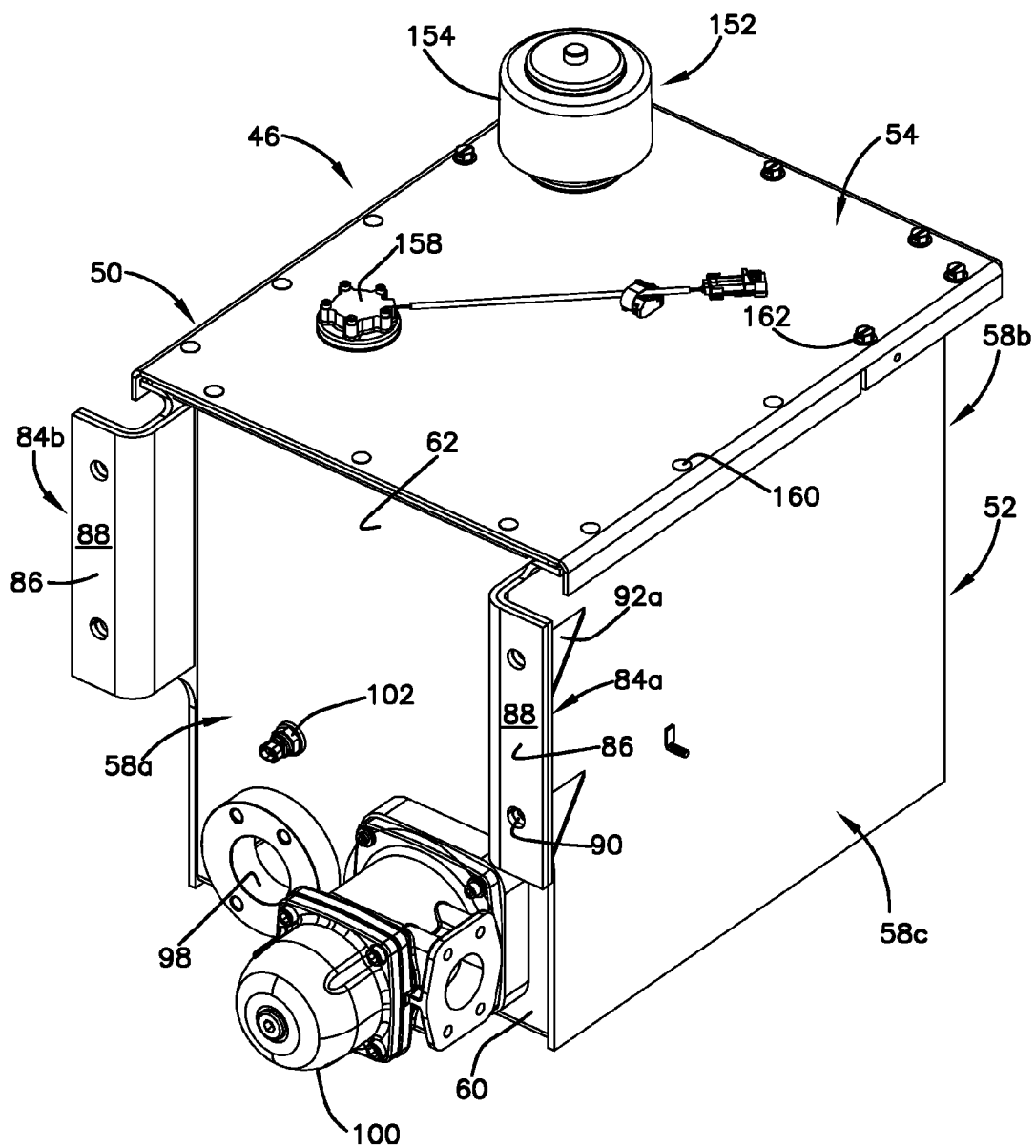
FIG. 2 is a perspective view of a fluid reservoir assembly.
Figure 3:
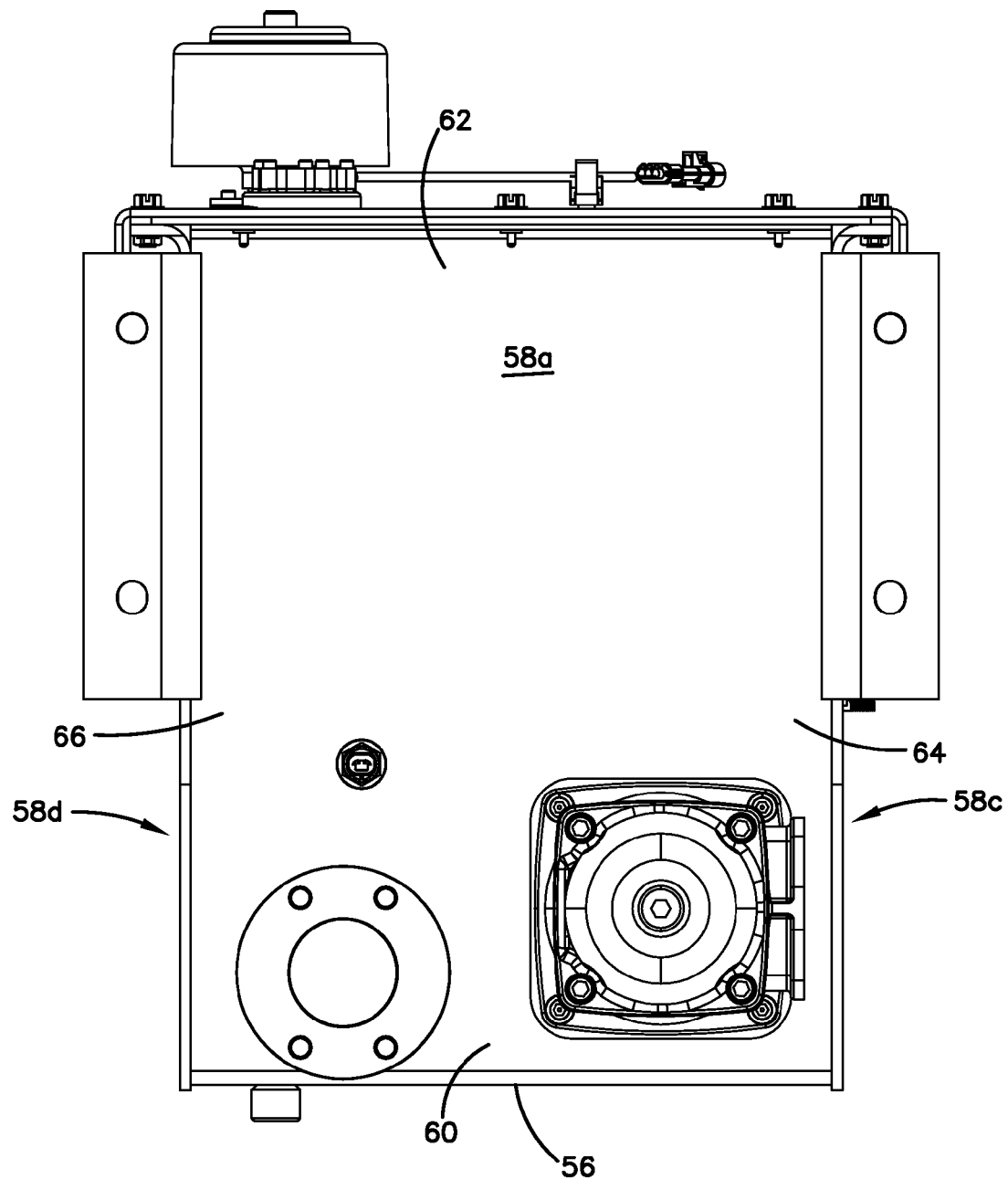
FIG. 3 is a front view of the fluid reservoir assembly of FIG. 2.
Figure 4:
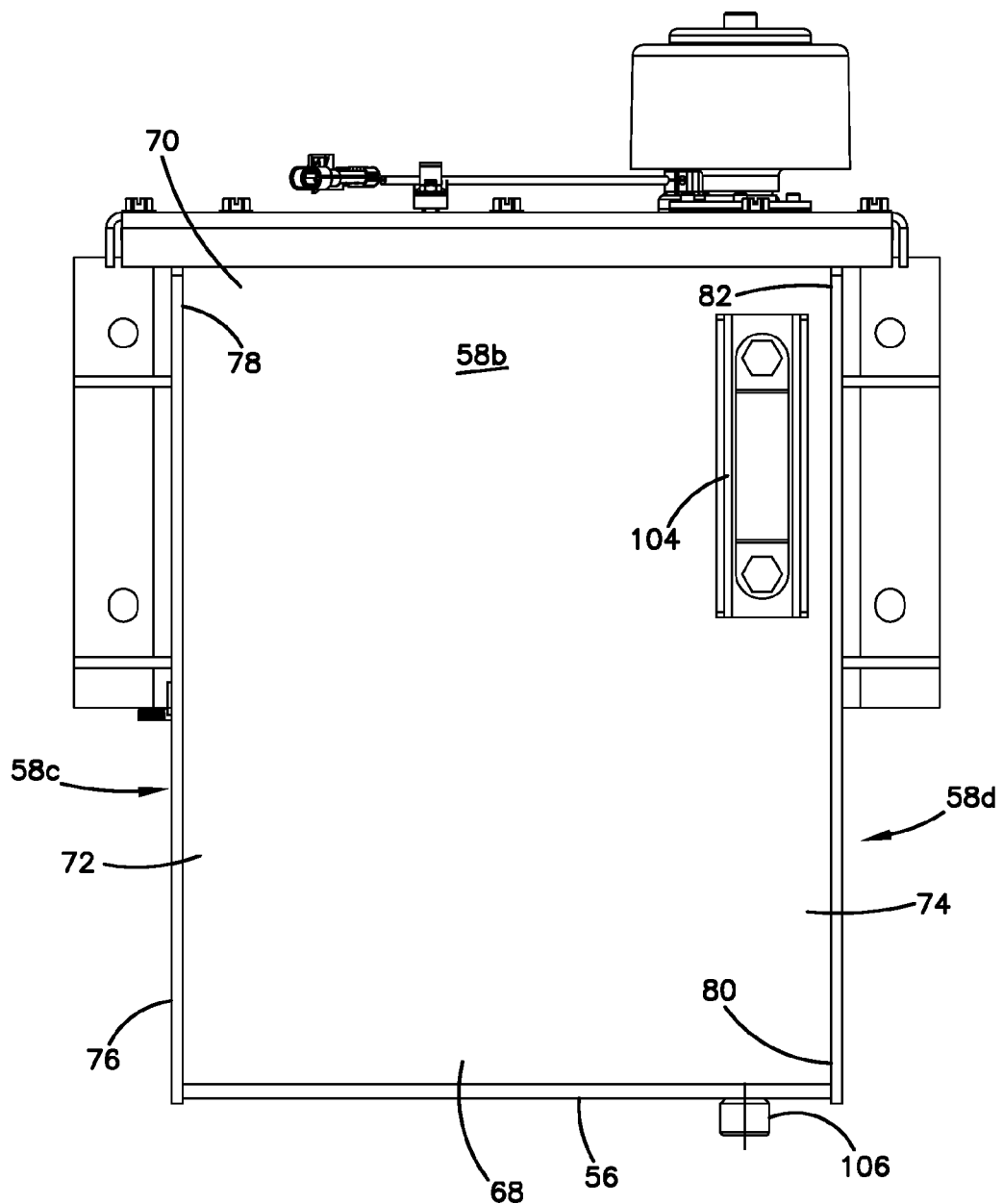
FIG. 4 is a rear view of the fluid reservoir assembly of FIG. 2.
Figure 5:
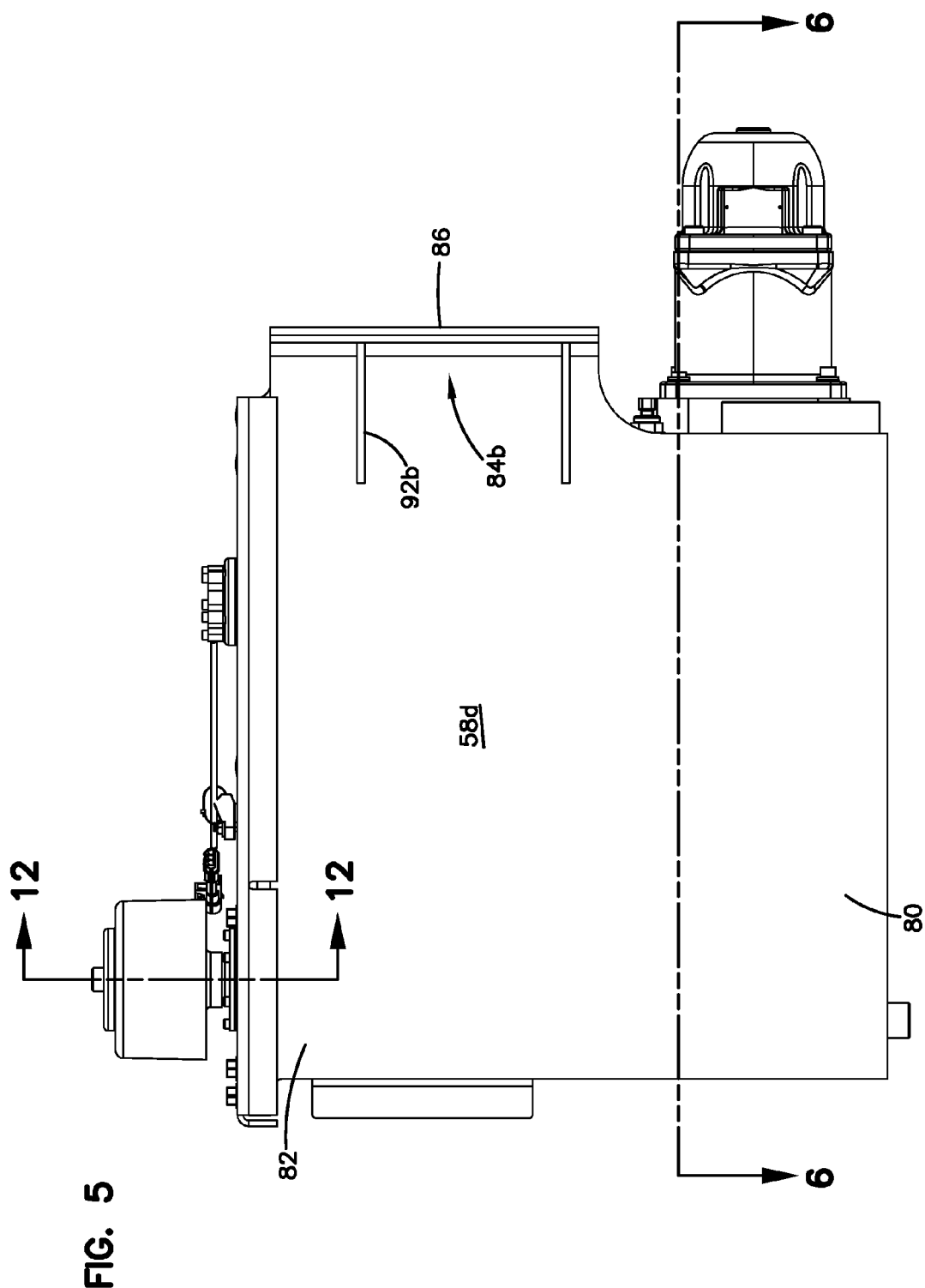
FIG. 5 is a side view of the fluid reservoir assembly of FIG. 2.
Figure 6:
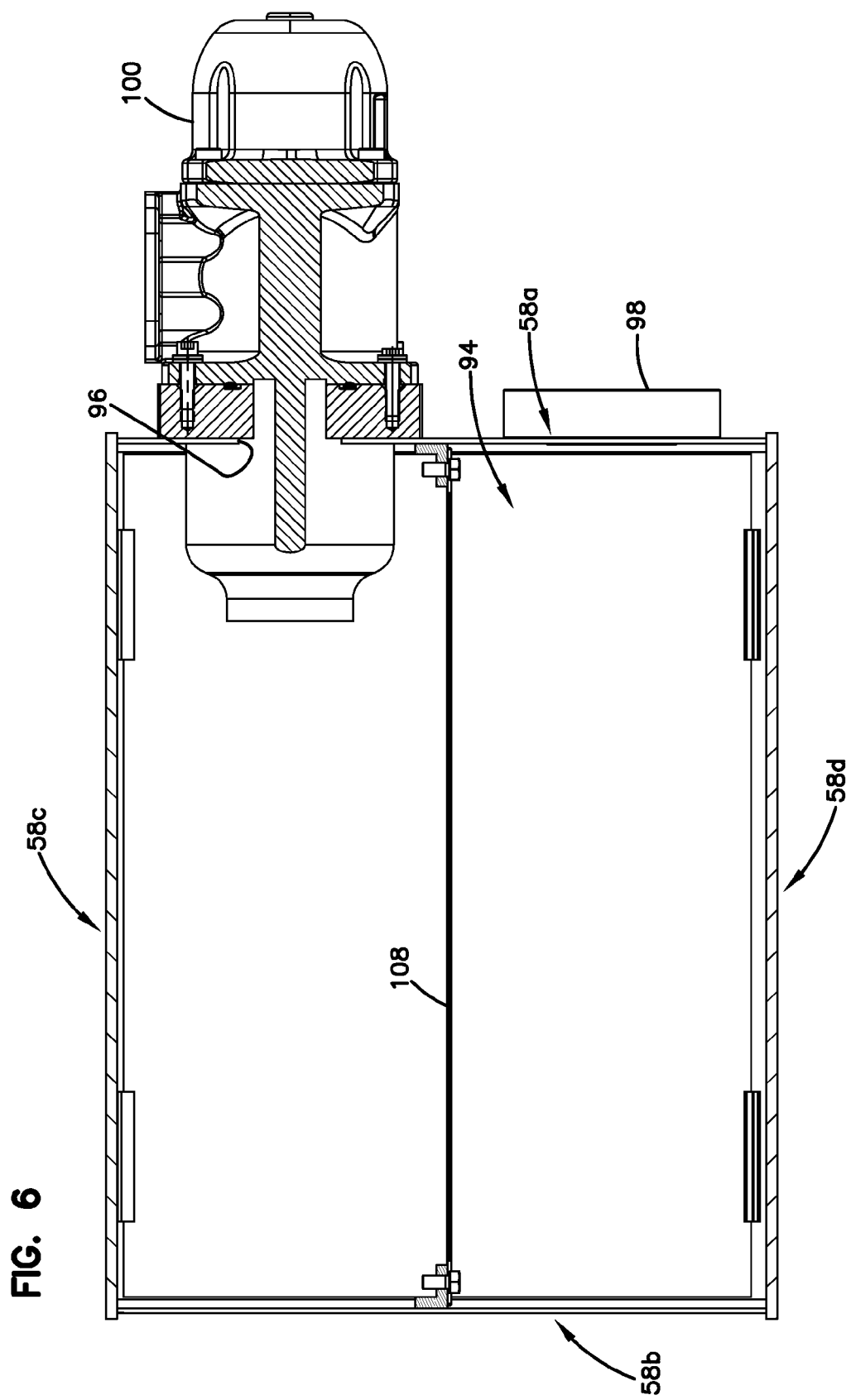
FIG. 6 is a cross-sectional view of the fluid reservoir assembly taken on line 6-6 of FIG. 5.
Figure 7:
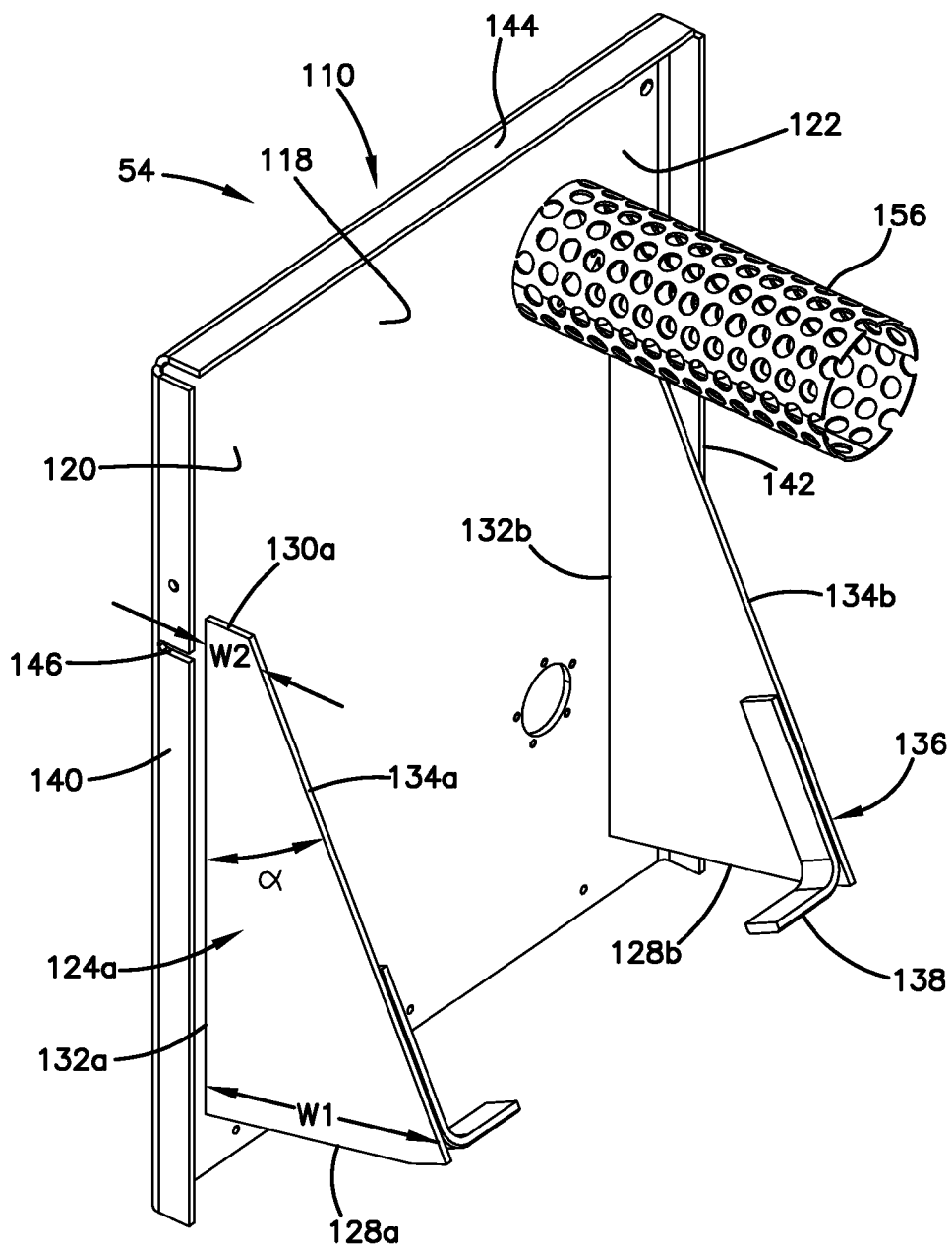
FIG. 7 is a perspective view of a cover assembly of the fluid reservoir assembly of FIG. 2.
Figure 8:
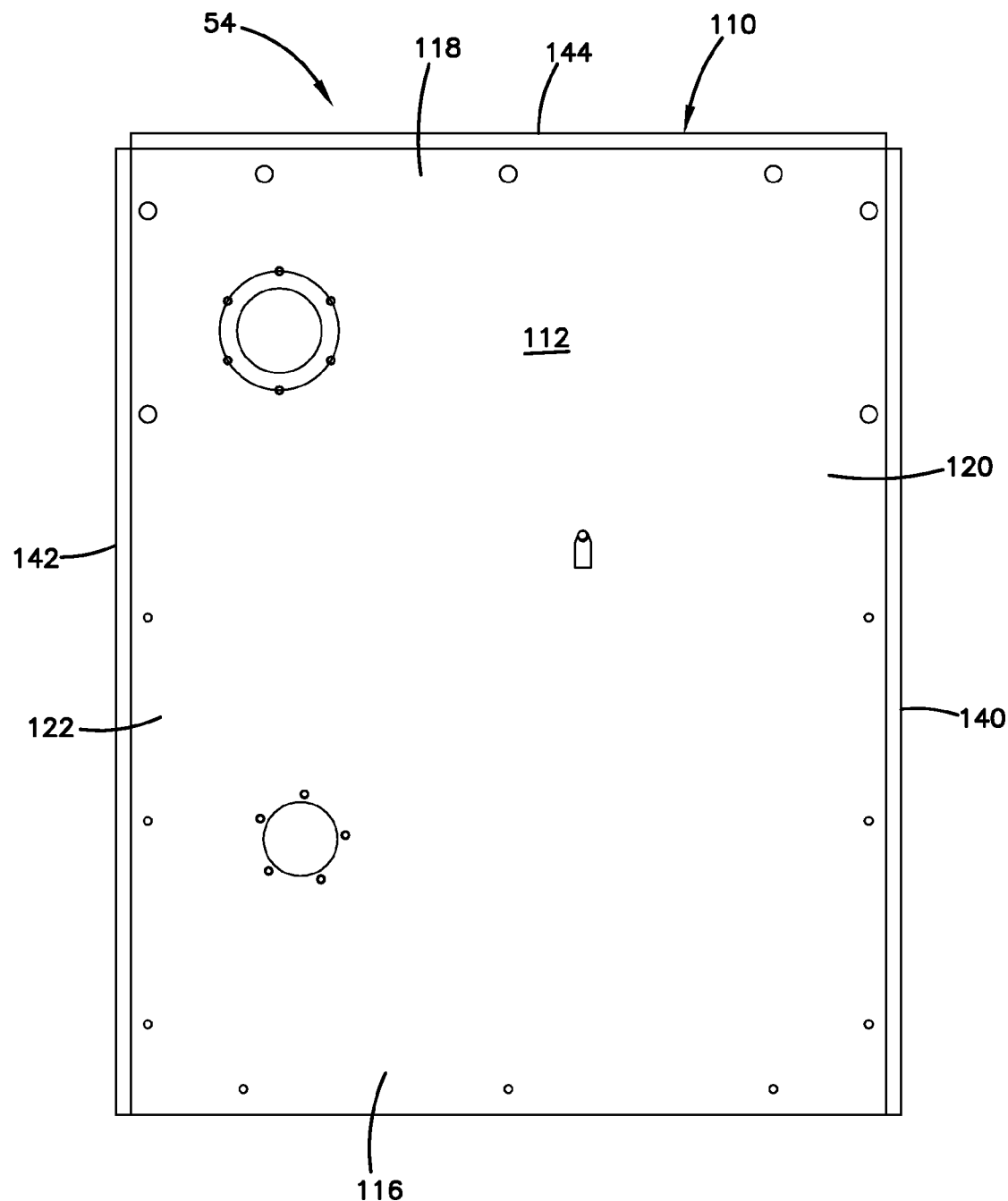
FIG. 8 is a top view of the cover assembly of FIG. 7.
Figure 9:
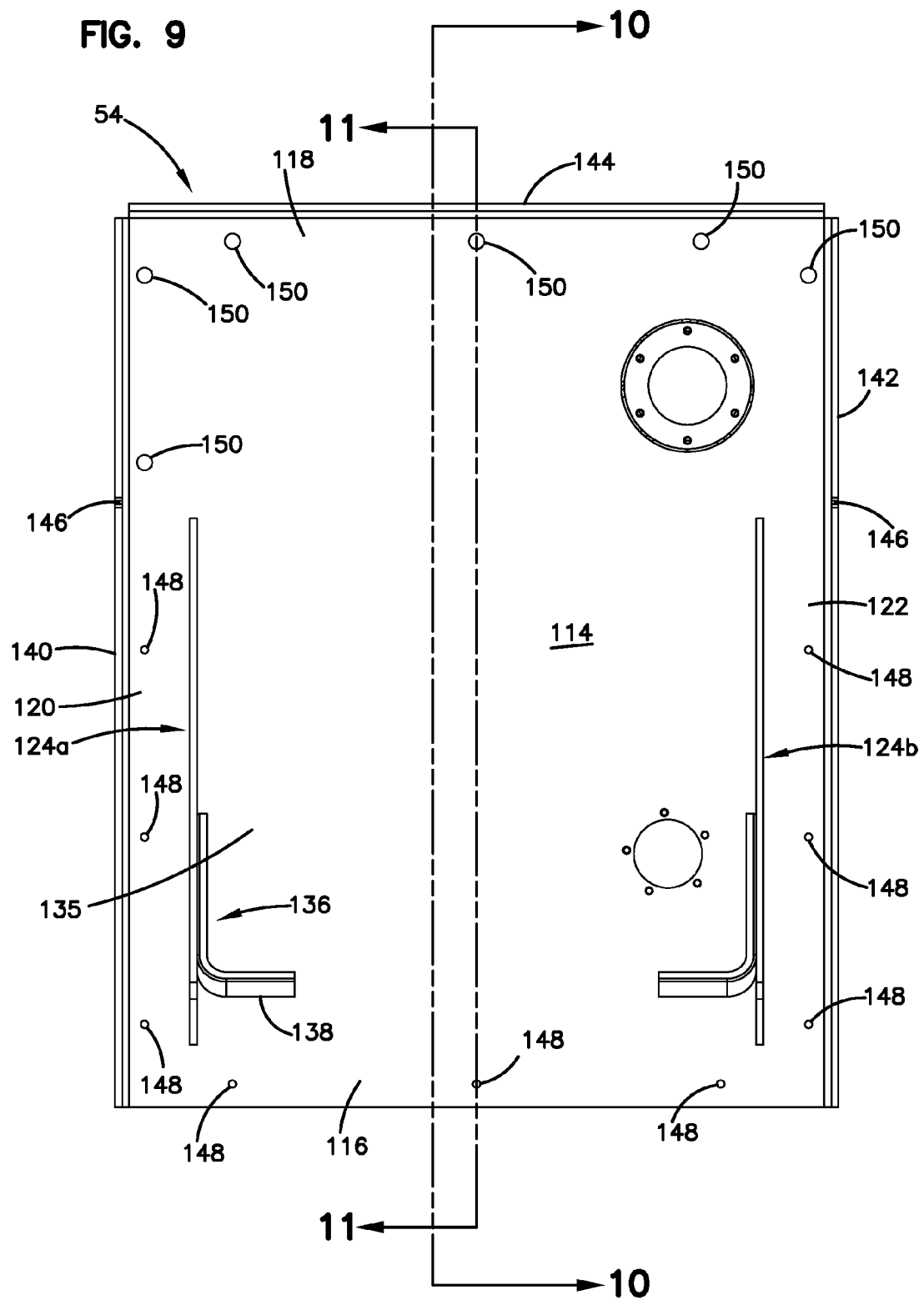
FIG. 9 is a bottom view of the cover assembly of FIG. 7.
Figure 10:
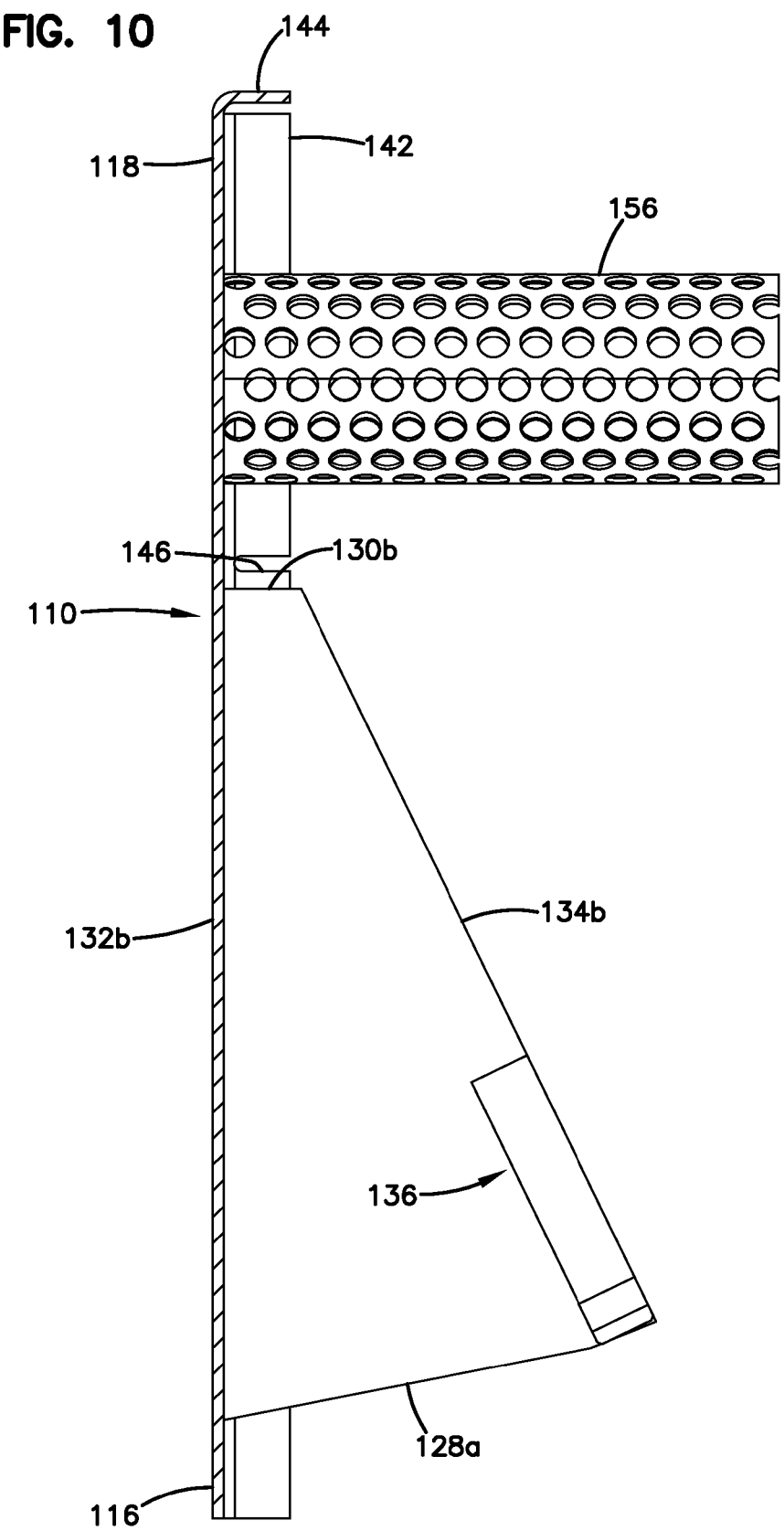
FIG. 10 is a cross-sectional view of the cover assembly taken on line 10-10 of FIG. 9.
Figure 11:
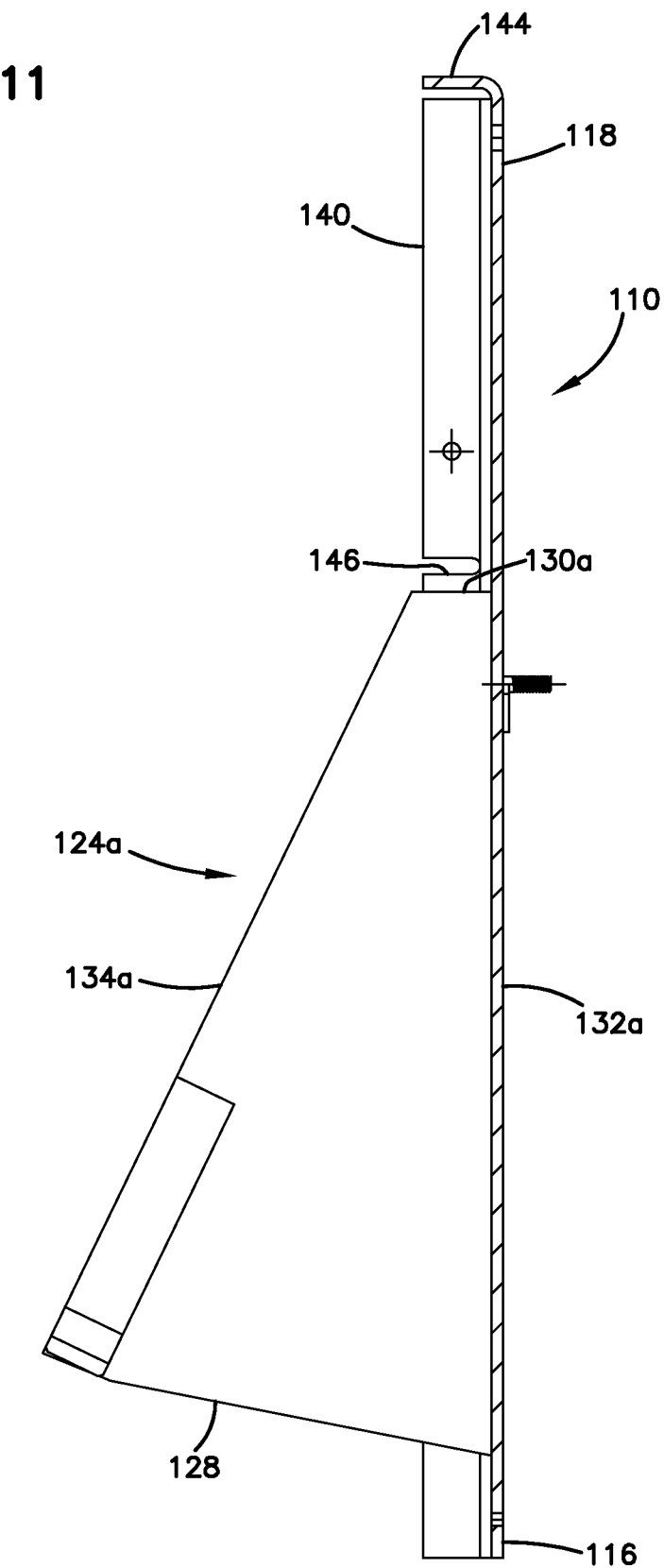
FIG. 11 is a cross-sectional view of the cover assembly taken on line 11-11 of FIG. 9.
Figure 12:
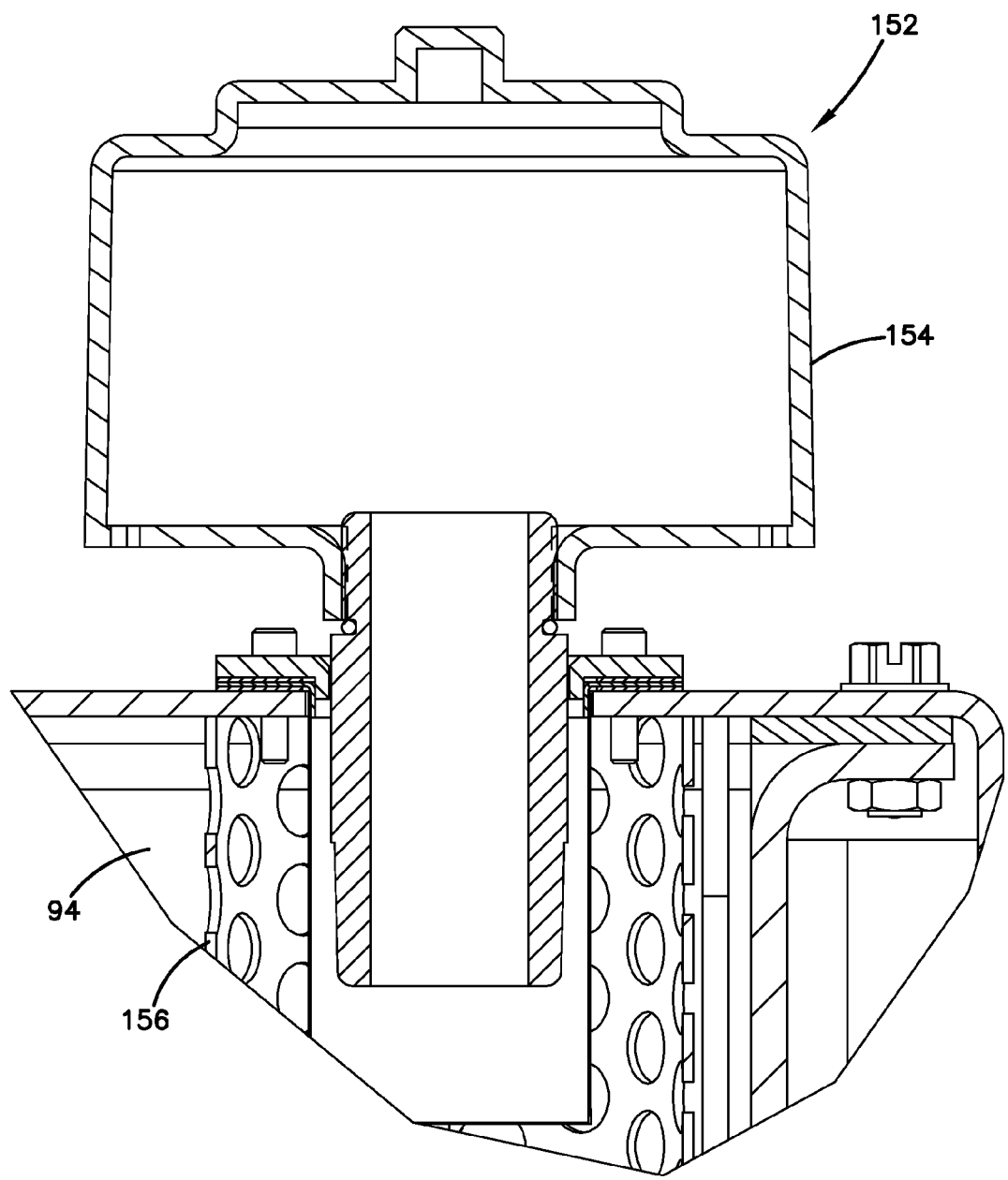
FIG. 12 is a cross-sectional view of a breather valve assembly taken on line 12-12 of FIG. 5.

Referring now to FIGS. 2, 7 and 12, the cover assembly 54 further includes a breather valve assembly 152. The breather valve assembly 152 is adapted to relieve pressure in the interior cavity 94 of the fluid reservoir assembly 46. The breather valve assembly 152 includes a breather valve 154 and a perforated tube 156. A conventional breather valve suitable for use as the breather valve 154 is product number BR310 manufactured by Eaton Corporation.

The perforated tube 156 is engaged with the second surface 114 of the cover 110 so that the perforated tube 156 extends outwardly at a direction that is generally perpendicular to the second surface 114. The perforated tube 156 surrounds a portion of the breather valve that extends below the second surface 114 of the cover 110.

Referring now to FIG. 2, the cover assembly 54 further includes an oil level sensor 158 disposed through the cover 110. A convention oil level sensor that is suitable for use as the oil level sensor 158 is model number LL 141/11 manufactured by Fozmula.

The cover assembly 54 is engaged to the base assembly 52 by a first plurality of fasteners 160 (e.g., bolts, screws, rivets, etc.) and a second plurality of fasteners 162 (e.g., bolts, screws, rivets, etc.). The first plurality of fasteners 160 is disposed through the first plurality of holes 148 of the cover 110 so that the first plurality of fasteners 160 is adjacent to the first end 116 of the cover 110 while the second plurality of fasteners 162 is disposed through the second plurality of holes 150 so that the second plurality of fasteners 162 is adjacent to the second end 118 of the cover 110.

The first plurality of fasteners 160 has a first strength. The second plurality of fasteners 162 has a second strength. The first strength is less than the second strength. It will be understood that the term strength can be tensile strength and/or shear strength depending on the orientation of the fasteners.

In one embodiment, the second strength is at least two times greater than the first strength. In another embodiment, the second strength is five times greater than the first strength. In another embodiment, the second strength is nine times greater than the first strength.

The difference in strength between the first and second pluralities of fasteners 160, 162 can be achieved though differences in the types of fasteners between the first and second pluralities of fasteners 160, 162, differences in materials, differences in size, etc., and combinations thereof.

In one embodiment, each of the first plurality of fasteners 160 is a rivet while each of the second plurality of fasteners 162 is a bolt. In another embodiment, each of the first plurality of fasteners is made of a first material (e.g., aluminum) while each of the second plurality of fasteners 162 is made of a second material (e.g., steel). In another embodiment, the first plurality of fasteners 160 has of a first cross-sectional area while the second plurality of fasteners 162 has a second cross-sectional area that is greater than the first cross-sectional area.

In the depicted embodiment, each of the first plurality of fasteners 160 is a hollow rivet having an outer diameter that is about 0.19 inches and an inner diameter that is about 0.13 inches. The first plurality of fasteners 160 in the depicted embodiment can be aluminum or steel.

In the depicted embodiment, each of the second plurality of fasteners 162 is a bolt having an outer diameter that is about 0.38 inches. The second plurality of fasteners 162 in the depicted embodiment is made of steel.

Figure 13:
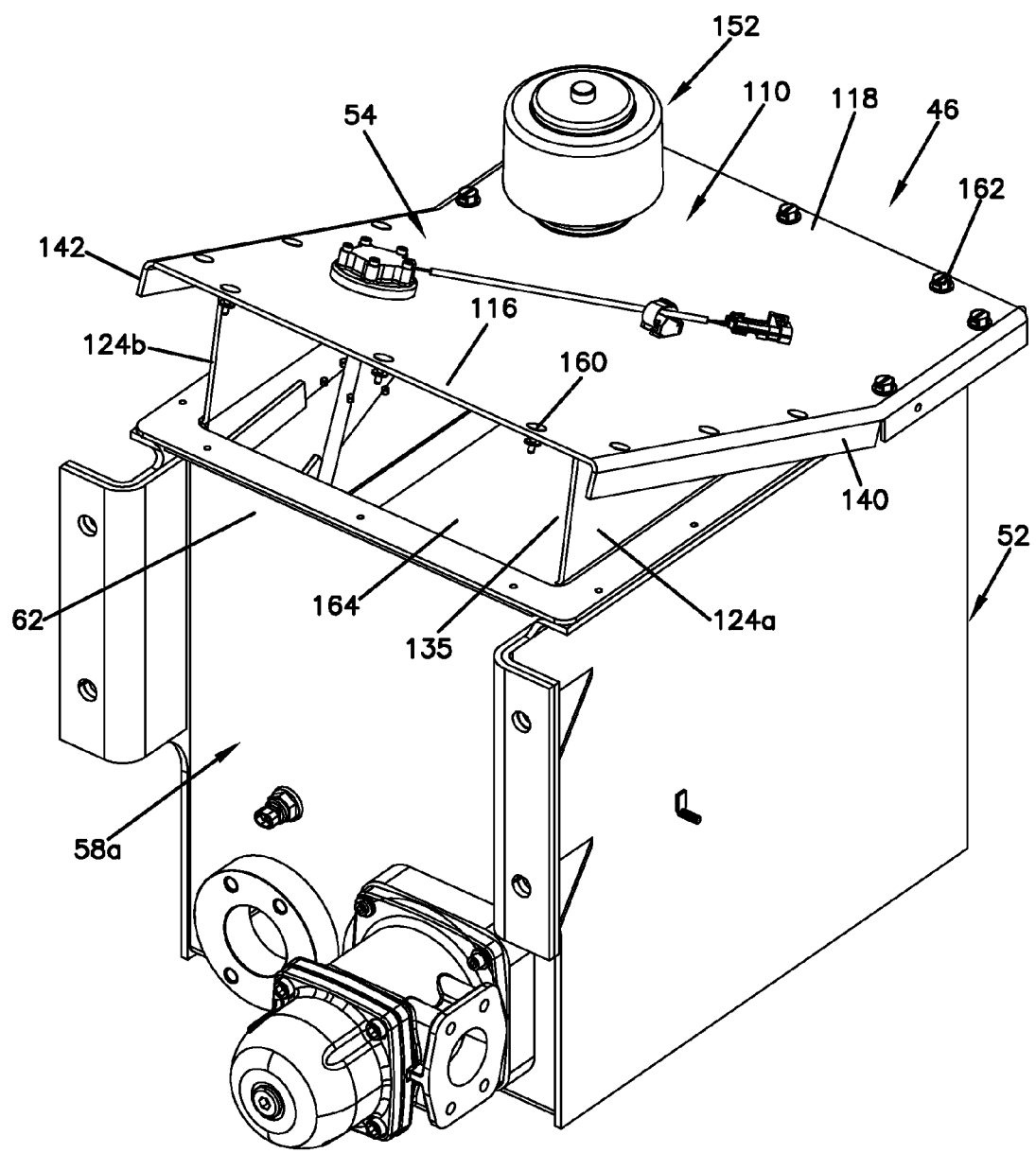
FIG. 13 is a perspective view of the fluid reservoir assembly

Referring now to FIGS. 2, 7 and 13, the operation of the fluid reservoir assembly 46 will be described. As fluid pressure increases in the fluid reservoir assembly 46, pressure is relieved through the breather valve assembly 152. If the pressure in the interior cavity 94 of the fluid reservoir assembly 46 increases more rapidly than can be relieved through the breather valve assembly 152, the pressure acts on the cover assembly 54 pushing the cover assembly 54 outwardly from the base assembly 52.

As the pressure pushes the cover assembly 54 outwardly from the base assembly 52, the first and second pluralities of fasteners 160, 162 are stressed. As the first plurality of fasteners 160 have a first strength that is less that the second strength of the second plurality of fasteners 162, the first plurality of fasteners 160 fracture or fail. In one embodiment, the first end 116 of the cover 110 is bent back toward the second end 118 of the cover 110 at a location generally aligned with the area of weakness in the first and second lips 140, 142.

As the first end 116 of the cover 110 bends toward the second end 118, an opening 164 is defined between the first end 116 of the cover 110 and the second end 62 of the first sidewall 58a though which fluid can flow. In one embodiment, the fluid is directed from the interior cavity 94, through the channel 135 disposed between the first and second side plates 124a, 124b of the cover assembly 54 and out the opening 164 defined by the cover 110 and the first sidewall 58a of the base assembly 52.

In the depicted embodiment, the extensions 138 of the brackets 136 mounted on the first and second side plates 124a, 124b are adapted to abut the first sidewall 58a as the first end 116 of the cover 110 is bent toward the second end 118 of the cover 110. The abutment between the extensions 138 and the first sidewall 58a is adapted to prevent the first end 116 of the cover 110 from bending further toward the second end 118.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fluid reservoir assembly comprising:
   a base defining an interior cavity adapted to receive a fluid;
   a cover having a pre-defined bend location, wherein the pre-defined bend location is positioned between a first portion and a second portion of the cover;

a plurality of fasteners including first and second fasteners arranged around a perimeter of the cover, wherein the plurality of fasteners are configured to attach the cover to the base, the first fasteners securing the first portion of the cover to the base and the second fasteners securing the second portion of the cover to the base, the first fasteners having a first strength and the second fasteners having a second strength, wherein the first strength is less than the second strength such that internal pressure acting upon the cover releases the first fasteners and pushes the first portion of the cover outwardly from the base while the second fasteners retain the second portion of the cover on the base thereby causing the cover to bend at the pre-defined bend location.

2. The fluid reservoir assembly of claim 1, wherein the first portion of the connection is a first plurality of fasteners and the second portion is a second plurality of fasteners.

3. The fluid reservoir assembly of claim 2, wherein the first fasteners is a plurality of rivets.

4. The fluid reservoir assembly of claim 3, wherein the second fasteners is a plurality of bolts.

5. The fluid reservoir assembly of claim 1, wherein the first fasteners are arranged only on the first portion of the cover and the second fasteners are arranged only on the second portion of the cover.

6. The fluid reservoir assembly of claim 1, wherein the cover is a one-piece cover.

7. A fluid reservoir assembly comprising:
a base assembly defining an interior cavity adapted to receive a fluid;
a cover assembly having a pre-defined bend location, the cover assembly including a first end and an oppositely disposed second end, wherein the pre-defined bend location is positioned between the first end and the second end of the cover assembly;
a first plurality of fasteners engaging the first end of the cover assembly to the base assembly;
a second plurality of fasteners engaging the second end of the cover assembly to the base assembly, the first and second plurality of fasteners being arranged around a perimeter of the cover assembly, the first plurality of fasteners having a first strength and the second plurality of fasteners having a second strength, wherein the first strength is less than the second strength such that internal pressure acting upon the cover assembly releases the first plurality of fasteners and pushes the first end of the cover assembly outwardly from the base assembly while the second plurality of fasteners retain the second end of the cover assembly on the base assembly thereby causing the cover assembly to bend at the pre-defined bend location.

8. The fluid reservoir assembly of claim 7, wherein the base assembly includes a base plate and a plurality of sidewalls engaged to the base plate.

9. The fluid reservoir assembly of claim 8, wherein each of the plurality of sidewalls includes a first end engaged to the base plate and a second end engaged to the cover assembly.

10. The fluid reservoir assembly of claim 7, wherein the first plurality of fasteners is a plurality of rivets.

11. The fluid reservoir assembly of claim 10, wherein the second plurality of fasteners is a plurality of bolts.

12. The fluid reservoir assembly of claim 7, wherein the first plurality of fasteners is made of an aluminum material.

13. The fluid reservoir assembly of claim 12, wherein the second plurality of fasteners is made of a steel material.

14. The fluid reservoir assembly of claim 7, wherein the second strength is at least two times the first strength.

15. The fluid reservoir assembly of claim 7, wherein the first strength is a first tensile strength and the second strength is a second tensile strength.

16. A fluid reservoir assembly comprising:
a base assembly defining an interior cavity adapted to receive a fluid;
a cover assembly having a pre-defined bend location, the cover assembly including:
a cover having a first end, an oppositely disposed second end, a first side and an oppositely disposed second side, wherein the pre-defined bend location is positioned between the first end and the second end of the cover assembly;
a first side plate engaged to the cover, the first side plate being disposed adjacent to the first side of the cover;
a second side plate engaged to the cover, the second side plate being disposed adjacent to the second side of the cover, the first and second side plates defining a channel;
a first plurality of fasteners engaging the first end of the cover assembly to the base assembly;
a second plurality of fasteners engaging the second end of the cover assembly to the base assembly, the first and second plurality of fasteners arranged around a perimeter of the cover assembly, the first plurality of fasteners having a first strength and the second plurality of fasteners having a second strength, wherein the first strength is less than the second strength such that internal pressure acting upon the cover assembly releases the first plurality of fasteners and pushes the first end of the cover assembly outwardly from the base assembly while the second plurality of fasteners retain the second end of the cover assembly on the base assembly thereby causing the cover assembly to bend at the pre-defined bend location.

17. The fluid reservoir assembly of claim 16, wherein the first plurality of fasteners is a plurality of rivets.

18. The fluid reservoir assembly of claim 17, wherein the second plurality of fasteners is a plurality of bolts.

19. The fluid reservoir assembly of claim 16, wherein the first plurality of fasteners is made of an aluminum material.

20. The fluid reservoir assembly of claim 19, wherein the second plurality of fasteners is made of a steel material.

21. The fluid reservoir assembly of claim 16, wherein the second strength is at least two times the first strength.

22. The fluid reservoir assembly of claim 16, wherein the first strength is a first tensile strength and the second strength is a second tensile strength.

* * * * *